(No Model.)

J. H. LINGLEY.
CURTAIN HANGER.

No. 282,912. Patented Aug. 7, 1883.

Witnesses
R. B. Fowler,
H. M. Fowler.

Inventor
John H. Lingley.

UNITED STATES PATENT OFFICE.

JOHN H. LINGLEY, OF WORCESTER, MASSACHUSETTS, ASSIGNOR OF ONE-HALF TO CHAS. AMIDON, OF SAME PLACE.

CURTAIN-HANGER.

SPECIFICATION forming part of Letters Patent No. 282,912, dated August 7, 1883.

Application filed February 5, 1883. (No model.)

*To all whom it may concern:*

Be it known that I, JOHN H. LINGLEY, a citizen of the United States, residing at Worcester, in the county of Worcester and State of Massachusetts, have invented a new and useful Improvement in Curtain-Hangers, of which the following is a specification.

My invention relates to a device for hanging window and other curtains so the curtain roll or pole may be easily and readily attached to the casing of a door or window, so as to be detachable and avoid marring or disfiguring the wood-work of the casing; and it consists, first, in the use of hooks having a spur or point to suspend the curtain-roll brackets to the top of the casing; second, in the use of a rod or bar to hold the brackets and keep them in a uniform distance apart; third, in the use of a central hook passing beneath the casing and drawing the suspension-hooks down firmly against the top of the casing; and, fourth, in the use of hooks, as described, made adjustable, so as to adapt my device to casings of varying widths.

Figure 1:
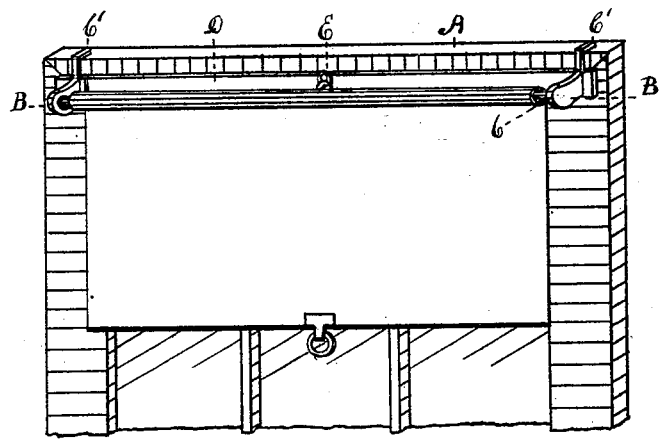
Figure 2:
Figure 3:
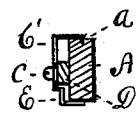

In the accompanying drawings, Figure 1 is a perspective view of a portion of a window-casing, showing the mode of attaching my improved device. Fig. 2 is a perspective view of my improved curtain-hanger detached from the casing, and Fig. 3 is a sectional view of the same on line S S.

Similar letters refer to similar parts in the several views.

In Fig. 1, A is the window-casing; B B, brackets holding the curtain-roll C. To the brackets B B, I attach the hooks C' C', the extreme ends of the hooks having small spur-points extending downward into the wood of the casing. These points are not shown in Fig. 1, but are shown at $a\ a$ in Figs. 2 and 3.

The brackets are attached to a bar, D, in the usual manner of attaching brackets to the casing.

The brackets are maintained at a uniform distance apart by the bar D, while they are suspended from the top of the casing by the two suspension-hooks C' C'. In Fig. 2 the hooks C' C' are attached to the bar D, instead of forming a part of the brackets B B, as shown in Fig. 1. I do not confine myself to either one of these two methods, as I consider both are within the scope of my invention.

To the center of the bar D, I attach the hook E, which passes down and inward beneath the lower edge of the casing, as shown in Fig. 3. I also make the vertical distance between the hook E and the hooks C' C' slightly less than the width of the casing A, so that after the hooks C' C' are attached to the upper edge of the casing it will be necessary to spring the center of the bar D downward in order to pass the hook E under the casing, as seen in Fig. 3, and the elasticity of the bar serves to draw the hooks C' C' and E firmly against the casing.

As the width of the casing A varies in different doors and windows, I make the hooks C' C' and E each with a loop, $b$, through which the screw $c$ passes into the bar D, attaching the hooks to the bar and permitting the hooks to be extended or contracted by loosening the attaching-screws, so as to suit the varying widths of different casings.

By my improved device I am able to attach the curtain to a door or window without screwing the brackets B B to the casing, and the bar D is readily detachable from the casing—a great advantage when the casings require cleaning or painting, or when the curtains are to be used on windows of different widths.

I do not claim, broadly, the use of a bar to which the curtain-brackets are attached; nor do I claim to have been the first to suspend the brackets from the top surface of the window-casing, as brackets having flanges resting upon the top of the window-frame and attached thereto by nails or screws have been heretofore used.

What I claim as my invention, and desire to secure by Letters Patent, is—

1. The combination, with the brackets of a curtain roll or pole, of a bar, D, and one or more suspension-hooks, C' C', having the spur-points $a\ a$, as and for the purposes set forth.

2. The combination, with the brackets of a curtain-roll attached to a bar, D, and one or more suspension-hooks, of the central hook, E, all arranged as described, and for the purpose set forth.

3. The combination, with a bar, D, and attached curtain-brackets B B, of the adjustable hooks C' C' and E, as and for the purpose set forth.

JOHN H. LINGLEY.

Witnesses:
R. B. FOWLER,
GEO. E. SMITH.